Patented May 21, 1940

2,201,157

UNITED STATES PATENT OFFICE 2,201,157

ORGANIC THIOCYANATES

Gerald H. Coleman, Midland, Mich., and Robert W. Sapp, Cambridge, Mass., assignors to The Dow Chemical Company, Midland, Mich., a corporation of Michigan No Drawing. Application May 1, 1939, Serial No. 271,171

9 Claims. (Cl. 260—454)

The present invention relates to organic thiocyanates and is particularly concerned with compounds having the following formula

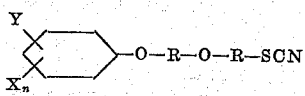

wherein each R represents an alkylene radical, Y represents a carbocyclic group containing 6 carbon atoms, X represents a lower alkyl radical, halogen or hydrogen, and $n$ is an integer not greater than 4.

The expression "lower alkyl" as hereinafter employed refers to alkyl radicals containing from 1 to 8 carbon atoms, inclusive.

We have prepared compounds of the aforementioned group, determined certain physical properties thereof whereby they may be readily identified, and found that they are particularly useful as insecticidal toxicants. These compounds are for the most part viscous, high-boiling liquids, substantially insoluble in water, but somewhat soluble in most organic solvents.

Our new compounds may be prepared by reacting a halo-alkoxy-alkyl ether of a suitable phenol with an alcoholic solution of an alkali metal thiocyanate. For example, an ether, such as beta-(4-cyclohexyl-phenoxy)-beta'-bromo-diethyl ether, and potassium thiocyanate are dissolved in absolute alcohol and the resulting solution heated to its boiling temperature under reflux for a period of time sufficient to accomplish the reaction. The preferred reaction temperature is between about 75° and about 90° C., although somewhat lower or higher temperatures may be employed, the reaction being carried out under autogenous pressure where temperatures above the boiling point of the solution prevail. While any suitable proportions of the halo-alkoxy-alkyl ether compound and alkali metal thiocyanate may be employed, substantially equi-molecular proportions thereof have been found to give the desired compound in good yield. The alcohol is preferably employed in amount sufficient to maintain the reactant and final ether product in solution. Following completion of the reaction, alcohol may be distilled out of the reaction mixture and the residue diluted with an excess of water, whereby a water-immiscible layer is formed. This layer is separated, washed with water, dried, and fractionally distilled to obtain the desired thiocyano-ether derivatives in substantially pure form.

The halo-alkoxy-alkyl ethers employed as reactants in the preparation of our new compounds are obtained by reacting suitable phenolates with di-(halo-alkyl) ethers under those conditions of temperature, pressure, and molecular proportion favoring the substitution of a substituted phenoxy group for one only of the halogens of the di-(halo-alkyl) ether compound.

The following examples described in detail the preparation of certain individual members of our new class of compounds, but are not to be construed as limiting the invention:

Example 1

A mixture of 110 grams (0.389 mole) of beta-(2-cyclohexyl-phenoxy)-beta'-chloro-diethyl ether (boiling point 182°–184° C. at 3 millimeters pressure), 37.8 grams (0.389 mole) of potassium thiocyanate, and 160 grams of ethyl alcohol was heated at 82°–83° C., the boiling temperature of the solution, and under reflux for 48 hours. The reaction mixture was then cooled to room temperature, alcohol distilled off, the residue diluted with an excess of water, and the water-immiscible layer separated by decantation. This crude product was washed with water, dried, and fractionally distilled, whereby there was obtained 70 grams (0.23 mole) of beta-(2-cyclohexyl-phenoxy)-beta'-thiocyano-diethyl ether as a mobile liquid boiling at 225°–232° C. at 4 millimeters pressure and having a specific gravity of 1.204 at 20°/4° C.

Example 2

In a similar manner, a mixture of 155.0 grams (0.56 mole) of beta-(2-xenoxy)-beta'-chloro-diethyl ether (boiling point 187°–189° C. at 3 millimeters pressure), 54.4 grams (0.56 mole) of potassium thiocyanate, and 160 grams of absolute alcohol was heated at 82°–83° C. and under reflux for 48 hours. Upon separation of the crude organic thiocyanate product, as described in Example 1, and fractionation, there was obtained 95 grams (0.317 mole) of beta-(2-xenoxy)-beta'-thiocyano-diethyl ether as a colorless liquid boiling at 226°–228° C. at 3 millimeters pressure and having a specific gravity of 1.174 at 20°/4° C. A 3 per cent kerosene solution of this compound knocked down 84 per cent in 10 minutes and killed 65 per cent in 48 hours of three-day old house flies, when tested according to the Peet-Grady method, substantially as described in Soap 8, No. 4, 1932. This spray composition was practically odorless and non-irritating under the conditions of the test.

In a similar manner, related thiocyanate derivatives may be prepared by substituting other halo-alkoxy-alkyl ethers of phenols for those shown in the examples. Representative of such compounds are beta-(4-xenoxy)-beta'-thiocyano-diethyl ether; beta-(3-chloro-4-xenoxy)-beta'-thiocyano-diethyl ether; beta-(5-tertiary-butyl-2-xenoxy)-beta'-thiocyano-diethyl ether; beta-(3-xenoxy)-beta'-thiocyano-diethyl ether; gamma-(3-chloro-2-xenoxy)-gamma'-thiocyano-dipropyl ether; beta-(3-chloro-4-xenoxy)-gamma'-thiocyano-dipropyl ether; (beta-3.5-dibromo-2-xenoxy-ethyl)(gamma'-thiocyano-propyl) ether; beta-(3-methyl-5-chloro-2-xenoxy)-beta'-thiocyano-diethyl ether; beta-(3.5-diisopropyl-2-xenoxy)-beta'-thiocyano-diethyl ether; beta-(3-chloro-5-bromo-4-xenoxy)-beta'-thiocyano-diethyl ether; beta-(3-tertiary-butyl-4-xenoxy)-beta'-thiocyano-diethyl ether; beta-(3.5.6-trichloro-2-xenoxy)-beta'-thiocyano-diethyl ether; beta-(2.4.5.6-tetrabromo-3-xenoxy)-beta'-thiocyano-diethyl ether; beta-(5-iodo-2-xenoxy)-beta'-thiocyano-diethyl ether; beta-(3-cyclohexyl-phenoxy)-beta'-thiocyano-diethyl ether; beta-(4-cyclohexyl-phenoxy)-beta'-thiocyano-diethyl ether; beta-(2.6-dimethyl-4-cyclohexyl-phenoxy)-beta'-thiocyano-diethyl ether; beta-(2-cyclohexyl-6-chloro-phenoxy)-beta'-thiocyano-diethyl ether; gamma-(2-isopropyl-4-cyclohexyl-phenoxy)-gamma'-thiocyano-dipropyl ether; gamma-(2-iodo-4-cyclohexyl-phenoxy)-gamma'-thiocyano-dipropyl ether; beta-(2.4.6-trimethyl-3-cyclohexyl-phenoxy)-beta'-thiocyano-diethyl ether; beta-(2-normal-octyl-4-cyclohexyl-phenoxy)-beta'-thiocyano-diethyl ether; beta-(2-chloro-4-bromo-6-cyclohexyl-phenoxy)-beta'-thiocyano-diethyl ether; (beta-2-xenoxy-ethyl)(delta'-thiocyano-butyl) ether; (3-xenoxy-butyl)(delta'-thiocyano-butyl) ether; (2-cyclohexyl-phenoxy-amyl)(thiocyano-amyl) ether; (4-cyclohexyl-phenoxy-hexyl)(thiocyano-hexyl) ether; and the like.

The present application is a continuation-in-part of our co-pending application Serial No. 229,871, filed September 14, 1938.

We claim:
1. A compound having the formula

wherein each R represents an alkylene radical, Y represents a carbocyclic group containing 6 carbon atoms, X represents a member of the group consisting of lower alkyl, halogen and hydrogen, and $n$ is an integer not greater than 4.

2. A compound having the formula

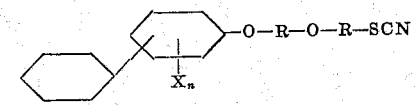

wherein each R represents an alkylene radical, X represents a member of the group consisting of lower alkyl, halogen and hydrogen, and $n$ is an integer not greater than 4.

3. A compound having the formula

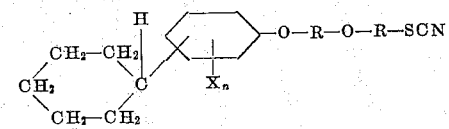

wherein each R represents an alkylene radical; X represents a member of the group consisting of lower alkyl, halogen and hydrogen, and $n$ is an integer not greater than 4.

4. A compound having the formula

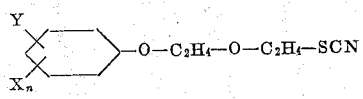

wherein Y represents a carbocyclic group, X represents a member of the group consisting of lower alkyl, halogen and hydrogen, and $n$ is an integer not greater than 4.

5. A compound having the formula

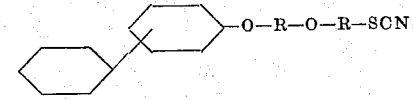

wherein each R represents an alkylene radical.

6. A compound having the formula

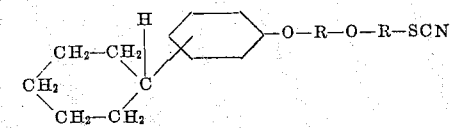

wherein each R represents an alkylene radical.

7. A compound having the formula

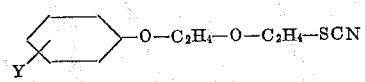

wherein Y represents a carbocyclic group containing 6 carbon atoms.

8. Beta-(2-xenoxy)-beta'-thiocyano-diethyl ether.

9. Beta-(2-cyclohexyl-phenoxy)-beta'-thiocyano-diethyl ether.

GERALD H. COLEMAN.
ROBERT W. SAPP.